United States Patent Office 2,758,001
Patented Aug. 7, 1956

2,758,001

PROCESS OF PREPARING ICE-COLORS IN TEXTILE PRINTING AND DYEING

Eugen Glietenberg, Leverkusen-Bayerwerk, and Josef Hassmann, Leverkusen-Schlebusch, Germany, assignors to Farbenfabriken Bayer Aktiengesellschaft, Leverkusen, Germany, a corporation of Germany No Drawing. Application October 7, 1952, Serial No. 313,582

Claims priority, application Germany October 22, 1951

2 Claims. (Cl. 8—45)

The present invention relates to a process of preparing ice-color in textile printing and dyeing.

In textile printing it is known to use caustic alkaline solutions of ice-color coupling components together with alkali salts of such diazoamino compounds as contain acid salt-forming groups in the radical (stabilizer) not taking part in the formation of the deystuff. These solutions, after adding thickening agents or other additions if desired, are applied to the fibre by printing or slop-padding. By a treatment of the fibres thus prepared with dilute acid or acid containing steam the dyestuff is developed. Further, neutral developing processes have become known which avoid certain disadvantages involved in the after-treatment with acids. In this case, when the development of the dyestuff is achieved by means of neutral steam, fixed alkalies must be replaced by volatile bases or by oxygen-containing nitrogenous bases sufficiently volatile with steam.

According to the present invention, ice-colors are obtained on the fibre in the printing or slop-padding process by simply steaming with neutral steam, the printing pastes or slop-padding solutions which are employed containing neutral fixed alkali salts of the diazoamino compounds with solubilizing groups in the stabilizer of a type as described below, and fixed alkali salts of ice-color coupling components.

The diazoamino compounds suitable for the process of the present invention correspond to the following general formula:

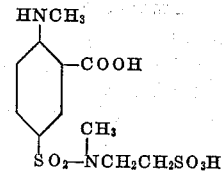

wherein R stands for aryl, $R_1$ for hydrogen, alkyl or substituted alkyl, and $R_2$ for the radical of an aminoalkyl sulphonic or carboxylic acid or an alkyl radical containing solubilizing groups.

The manufacture of these diazoamino compounds is described in French Patent No. 875,276. It is characteristic of the stabilizers contained in these diazoamino compounds that they have solubilizing groups not only directly attached to the benzene nucleus but also in the external radical $R_2$.

The obvious advantage of the new process resides in the fact that in a neutral developing process the fixed alkali salts of diazoamino compounds can be employed and the use of volatile bases can be dispensed with.

The printing pastes and slop-padding solutions are prepared with the usual solvents and thickening agents. As a modification of the process according to the present invention it is particularly advantageous for practical purposes to dispense with the separate preparation and isolation of the alkali salts of the ice-color coupling components to be used and to employ instead solutions of the ice-color coupling components in fixed alkalies, the quantity of alkali employed corresponding to about 40 to 120 percent of the quantity theoretically necessary for the formation of the alkali salts.

The prints and dyeings obtained according to the new process are distinguished by full and strong shades.

The following examples are given for the purpose of illustrating the invention:

*Example 1*

1 mol of diazotized 1-amino-2-methyl-5-chlorobenzene is run into a solution, containing excess sodium acetate, of 1.1 mol of the sodium salt of the following compound:

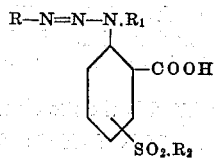

With good cooling aqueous caustic soda solution is slowly added until an alkaline reaction of the mixture is obtained. The diazoamino compound formed is separated by adding sodium chloride.

60 grams of a mixture consisting of equivalent parts of the sodium salt of the diazoamino compound thus formed and of 1 - (2′.3′ - hydroxynaphthoylamino) - 2 - methylbenzene are dissolved with 50 cc. of alcohol or another suitable solvent and 3 to 4 cc. of caustic soda solution of 38° Bé. in approximately 300 cc. of water of 50 to 60° C. and, after stirring into 500 grams of thickening agent, made up with water to 1000 grams.

This printing paste is printed on the fibre. After drying, the printed textile material is developed in neutral steam (Mather & Platt ager) for 5 minutes and thereafter soaped at the boil. A full bloomy red is obtained.

If in this printing paste the 1-(2′.3′-hydroxynaphthoylamino)-2-methylbenzene is replaced by the 1-(2′.3′-hydroxynaphthoylamino)-2-ethoxybenzene, a clear and full scarlet is obtained. By using instead of such 2.3-hydroxynaphthoylarylamides, 3.3′-dimethyl-4.4′-diacetoacetylamino diphenyl, for example, a full and bloomy yellow is obtained. In this case only 2 to 3 cc. of caustic soda solution of 38° Bé. per kilogram of printing color are preferably used in preparing the printing paste.

*Example 2*

By using, according to Example 1, the sodium salt of the diazoamino compound prepared from 1-amino-2-methoxy-5-chlorobenzene and the stabilizer described in that example, there is obtained with (a) 1-(2′-hydroxynaphthoylamino) - 2 - methoxybenzene a bluish-red, (b) 1 - (2′ - hydroxycarbazol-3′-carboylamino)-4-chlorobenzene a full brown, (c) 1-acetoacetylamino-4-benzoylamino - 2.5-dimethoxybenzene a bloomy golden orange.

In the case of (a) and (b) 6 cc., and of (c) 4 cc. of caustic soda solution 38° Bé. per kilogram printing color are preferably used. The printings on staple fibre fabric and cuprammonium silk are in strength equal to those on cotton.

*Example 3*

A printing paste prepared in the manner of the preceding examples from the sodium salt of the diazoamino compound of 1-amino-2-methyl-4-chlorobenzene with the stabilizer mentioned in Example 1 and 1-acetoacetylamino-4-chloro-2.5-dimethoxybenzene yields, when developed with neutral steam, a fine greenish-yellow.

Example 4

A printing paste prepared correspondingly from the sodium salt of the diazoamino compound from 1-amino-2-methylbenzene-5-sulphonic dimethylamide with the stabilizer of the formula:

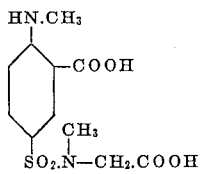

described in Example 1 of French specification No. 875,276 and 1-(2'.3'-hydroxynaphthoylamino)-2-ethoxybenzene yields when developed with neutral steam a very fine orange.

Example 5

By using in the printing paste according to the foregoing Example 1 the sodium salt of the 1-(2'.3'-hydroxynaphthoylamino)-2-methylbenzene instead of 1-(2'.3'-hydroxynaphthoylamino)-2-methylbenzene and caustic soda solution, the same full and bloomy red is obtained.

In analogous manner the same results are also achieved in the other foregoing examples by using the alkali salts of the ice-color coupling components instead of these ice-color components with small quantities of caustic soda solution.

Example 6

1 mol of diazotized 1-amino-2.5-dichlorobenzene is run into a sodium alkaline solution containing 1.1 mol of the following compound:

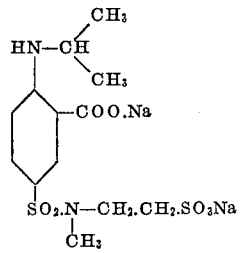

The diazoamino compound is separated by means of sodium chloride.

60 grams of a mixture consisting of equivalent parts of the sodium salt of the diazoamino compound thus formed and 1-(2'.3'-hydroxynaphthoylamino)-2-ethoxybenzene are dissolved in 50 cc. of alcohol or another suitable solvent and about 4 to 6 cc. of caustic soda solution of 38° Bé. in approximately 300 cc. of water of 60 to 80° C. and, after stirring into 500 grams of thickening agent, made up with water to 1000 grams.

This printing paste is printed on the fibre. After drying the printed textile material is developed in neutral steam (Mather & Platt ager) for 5 minutes and thereafter soaped at the boil. A full and bloomy orange is obtained.

If in this printing paste the 1-(2'.3'-hydroxynaphthoylamino)-2-ethoxybenzene is replaced by the 1-(2'.3'-hydroxynaphthoylamino)-2-methoxybenzene, a clear and fast scarlet is obtained.

Example 7

If the diazo component in Example 1 is replaced by diazotized 1-aminoanthraquinone a diazoamino compound is obtained which can be separated as a sodium salt in good yield by means of sodium chloride.

60 grams of a mixture consisting of equivalent parts of sodium salt of the diazoamino compound thus formed and the 1-(2'.3'-hydroxynaphthoylamino)-2-methoxybenzene are dissolved in 50 cc. of glycolmonoethyl ether or another suitable solvent, and about 4 cc. of caustic soda solution of 38° Bé. in approximately 300 cc. of hot water and, after stirring into 500 grams of thickening agent made up with water to 1000 grams. This printing paste is printed on the fibre. After drying the printed textile material is developed in neutral steam (Mather & Platt ager) for 5 minutes and thereafter soaped at the boil. A full and fast red is obtained.

We claim:

1. In the process of preparing ice-colors in textile printing and dyeing from ice-color coupling components and diazoamino compounds of the general formula:

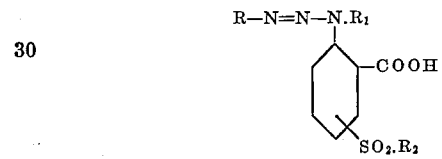

wherein R is a member of the group consisting of halomethyl-phenyl, halo- lower alkoxy-phenyl, lower alkyl-N-di(lower alkyl)sulfonamido-phenyl, dihalophenyl and anthraquinonyl, $R_1$ is a member of the group consisting of hydrogen, alkyl and substituted alkyl and $R_2$ is a member of the group consisting of amino-alkyl sulfonic acid and amino-alkyl carboxylic acid, the modification which consists in applying to the fiber dyestuff compositions consisting essentially of neutral fixed alkali salts of ice-color coupling components, and developing the dyestuff by steaming with neutral steam.

2. Process as claimed in claim 1 wherein solutions of the ice-color coupling components in about 40 to 120 per cent of the quantity of fixed alkalies theoretically required for the formation of the alkali salts are used as the alkali salts of the ice-color coupling components.

References Cited in the file of this patent

FOREIGN PATENTS

| | | |
|---|---|---|
| 846,748 | France | June 12, 1939 |
| 875,276 | France | June 15, 1942 |
| 540,978 | Great Britain | Nov. 7, 1941 |